Dec. 15, 1964   N. FISHER   3,161,398
READING STAND
Filed April 19, 1963   2 Sheets-Sheet 1
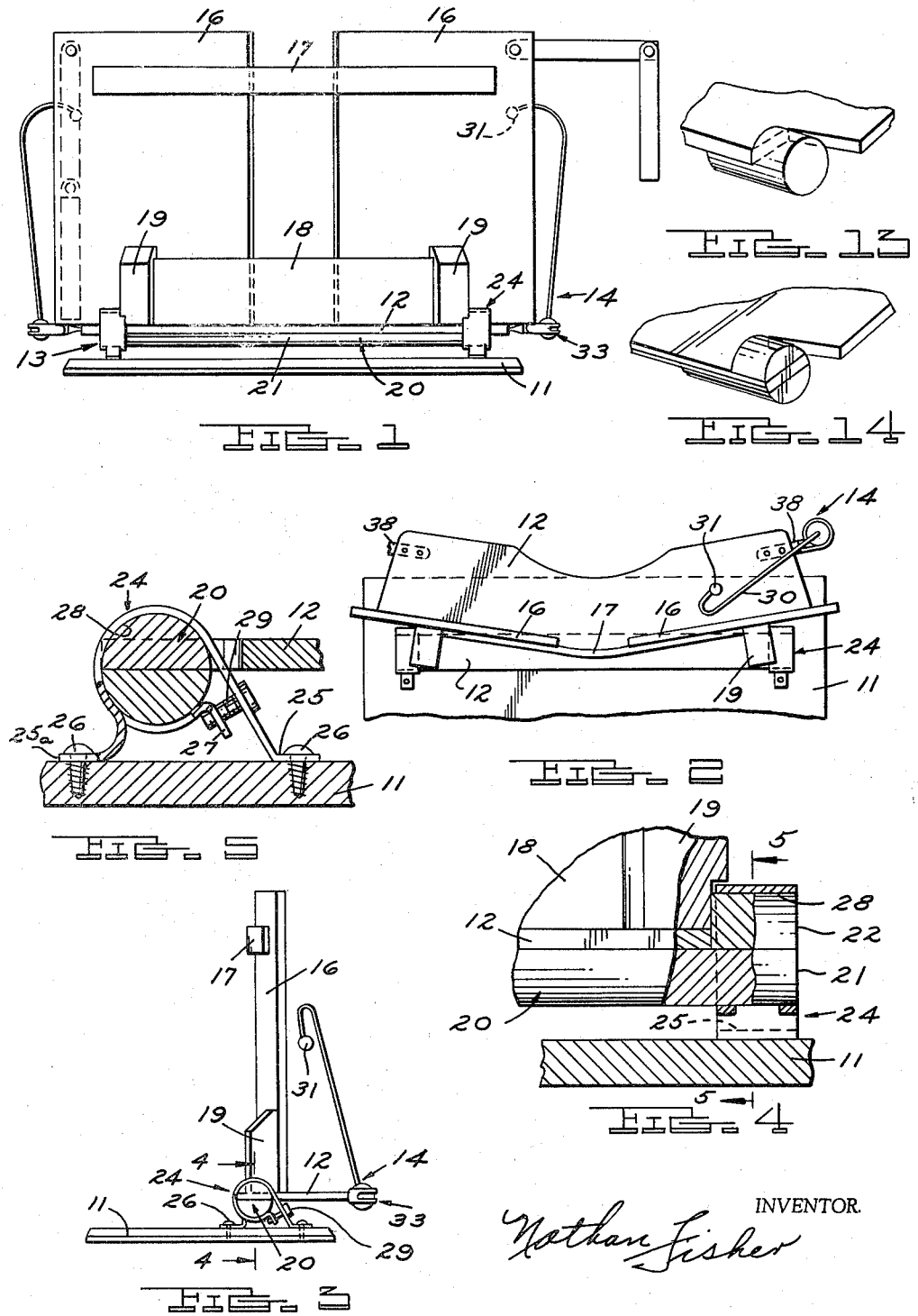
INVENTOR.
Nathan Fisher Dec. 15, 1964   N. FISHER   3,161,398
READING STAND
Filed April 19, 1963   2 Sheets-Sheet 2
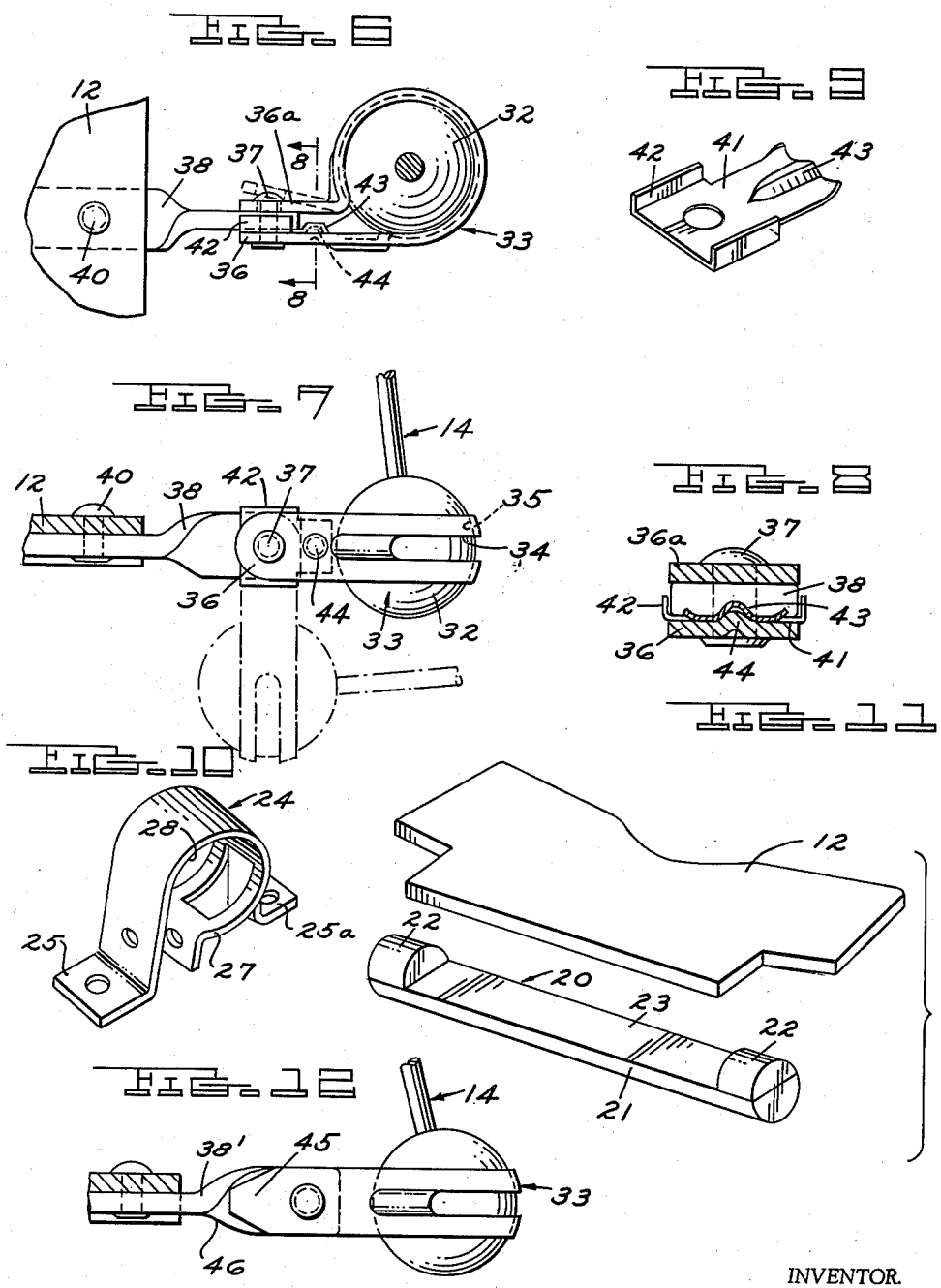
INVENTOR.
Nathan Fisher

United States Patent Office 3,161,398
Patented Dec. 15, 1964

3,161,398
READING STAND
Nathan Fisher, 11892 Ohio Ave., Detroit, Mich.
Filed Apr. 19, 1963, Ser. No. 274,159
14 Claims. (Cl. 248—451)

This invention relates to book stands, in particular, adjustable book stands intended to support material in a convenient position for reading.

In book stands of the past, with a general emphasis on compact folding and portability at the expense of other important advantages, insufficient utility existed to warrant or gain their general acceptance. Visual adjustment was generally awkward and page control unsatisfactory or non-existent.

Among the desirable features for a reading stand, and which this invention seeks to embody, are:

Simplicity in structure and operation without distraction;

Light weight, rigidity, and stability against tipping;

Secure support and positioning;

Safety against accidental harm to reading material, particularly under intense use;

Simple tilting arrangement for best visual position;

Satisfactory use for a broad range of sizes of reading materials;

Effective control of book and page movement;

High degree of reliability and durability;

Attractiveness to create interest and desire to use.

An object of this invention is to provide an improved reading stand for pleasure reading and profitable study.

It is a further object to provide for relaxed viewing and manual freedom.

Another object is to help reduce reading fatigue and distraction.

To correct a glare condition which a glossy reading surface often presents, a slight angular position change is sometimes necessary. Therefore, it is a further object of this invention to provide angular positioning permitting a fine degree of adjustment for maximum visual comfort, and to provide an adjustable hinging arrangement that is free of props, ratchets, thumbscrews, or other distracting gadgets, thereby allowing a simple one hand operation.

It is another object to provide a hinge bracket that is non-obtrusive, self-supporting and integrally adjustable as required for differences in book weight.

Many books, particularly when new, have hard stiff bindings that causes distracting effort to keep the book open. Attempts to correct this fault sometimes results in a cracked or broken binding as witnessed by binderies in public library systems.

It is therefore a further object of this invention to provide for effective control of page movement.

It is also an object to provide a page holding device that is non-obscuring, will hold pages of a book neatly in place, and permits sensitive control of pressure for easy leafing.

Another object is to provide for relaxed reading in many environments.

Another object is to provide a reading stand that is neat and pleasing in appearance.

And, finally, in summation, it is an object to provide a bookstand that will help make reading as relaxed, simple, and absorbing as watching television.

Other objects and a fuller understanding of the invention may be had by referring to the following description and claims taken in conjunction with the accompanying drawings, in which:

FIGURE 1 is a rear elevation view of a reading stand embodying the invention.

FIG. 2 is a fragmentary plan view of the reading stand.

FIG. 3 is a side view of the reading stand.

FIG. 4 is a fragmentary sectional view on an enlarged scale taken along the line 4—4 in FIG. 3.

FIG. 5 is a fragmentary sectional view taken along the line 5—5 in FIG. 4.

FIG. 6 is a fragmentary plan view on an enlarged scale showing a top view of the page control.

FIG. 7 is a side elevation view of the page control shown in FIG. 6.

FIG. 8 is a sectional view taken along the line 8—8 in FIG. 6.

FIG. 9 is a perspective view of a snap spring utilized in the page control shown in FIGS. 6-8.

FIG. 10 is a perspective view of the hinge bracket.

FIG. 11 is an exploded perspective view of the hinge pin and book-supporting platform, to be referred to as the pintle-platform.

FIG. 12 is a view similar to FIG. 7 showing stationary page control.

FIGS. 13 and 14 are fragmentary perspectives showing alternate structures of the pintle-platform structure.

For clarity of understanding, the following description of this invention may be considered as having three principal divisions, the hinging arrangement, the superstructure, and the page control.

In FIG. 11 is shown the hinge pin-platform structure comprising a book-supporting platform 12 to be mounted on hinge pin 20, the latter being rotatably mounted, as in FIGS. 1, 3, and 5, to a pair of hinge brackets 24 which, in turn, are fastened along an edge to the base 11. Referring to FIGS. 1 and 2, the superstructure, which is mounted on platform 12, comprises back plates 16 tied by cross braces 17 and 18, and bracing blocks 19. Referring to FIGS. 1, 2, and 3, the page control 14 is shown fastened to platform 12.

The hinge pin 20 comprises a length of structural material 21, full half round in cross section, on each end of which is mounted a short length of identical cross section 22 to form the cylindrical pintles. The supporting platform 12, of flat structural material, shaped in general as shown in FIG. 2 to form a book-supporting platform, is notched out to clear the pintles and adhesively mounted to hinge pin support surface 23. An alternate construction of the pintle-platform with integrally formed pintles, is shown in FIG. 13, and another construction in FIG. 14.

Referring to FIGS. 5 and 10, each hinge bracket 24 is formed of a single strip of sheet metal, with an intermediate struck out slitted portion. The strip is cylindrically arched and formed with an internal surface 28 to contain a pintle, and is end flanged at 27, the flange being parallel to and a short distance from a sloping leg 25. The struck out portion 25a and leg 25 are flanged and fixed to base 11 by screws 26. A sheet metal adjusting screw 29, shouldering over an opening in leg 25, threads into flange 27 to adjust rotational friction on the pintles. The ample pintle bearing surface co-operating with the adjustable friction hinge brackets thus provides easy, smooth positioning with a durable pre-set holding torque.

Referring to FIGS. 1 and 2, the superstructure comprises a pair of rectangular flat plates 16 angularly positioned at approximately 160 degrees by the prebent cross braces 17 and 18. Bracing blocks 19, circularly notched to clear bracket assembly 13, are adhesively secured to plates 16 and abut brace 18. The above angular superstructure is centrally mounted on hinge plate 12 between the brackets, rigidly secured with modern high strength adhesives. This angular arrangement insures a more stationary nesting position with protection against excess strain or cracking of the book binding. A pair of swivel extension arms, fastened to plates 16, provide extra support for large flexible reading material.

Each page control 14 comprises a hook-shaped wire arm, capped at one end 31 with plastic or other frictional material, and a hard-surfaced spherical ball 32, frictionally enclosed by a bracket-supported spring housing 33, at the other end. Referring to FIGS. 6, 7 and 12, the housing 33, a thin properly heat treated spring steel strip, is slotted at 34 to produce parallel bands 35, bent and formed to the ball contour. A leg 36a is angularly prebent from one end of the curved housing portion and is parallel to a leg 36 extending from the other end, the legs being accurately located relative to a rivet 37, which passes through a supporting bracket 38 between the legs and secures the legs thereto. The metal housing bracket 38 is twisted 90 degrees for upright housing support and pierced for rivet 37, and a rivet 40 which secures it to hinge plate 12. On force riveting housing 33 to bracket 38, the housing is forced into tension, compression loading the ball, and at the same time creating a spring flexed lateral displacement force in the bands 35. This induced spring load is the predominant factor in effecting a superior constant torque swivel, smooth acting, wear compensating, and durable.

Referring to FIG. 12, showing the basic embodiment of the page control, the shoulders 46, formed by the twist, rigidly lock the trimmed ends 45 of the housing preventing pivotal movement about rivet 37. A convenient downswing feature is indicated in FIGS. 6 and 7, desirable when handling extra wide magazines, etc., or in rapid leafing where a page control is unnecessary or distracting. To provide a firm repositioning swivel movement with the pivot about rivet 37, a thin metal snap spring, FIG. 9, is incorporated. This comprises a tempered spring 41, pierced for rivet 37, embossed with V-impression 43 to engage with mating projection 44 in leg 36 of the housing, and ear flanged at 42 to locate on bracket 38 as shown in FIG 8. In this snap spring embodiment of the housing, the ends of the legs 36 and 36a are shortened and rounded off to clear shoulders 46. Pressure on the ball flexes the snap spring out of engagement.

Formerly, page holding was generally by application of a flat spring pressure clamp, limited in positioning on the page while applying such excess pressure as to hinder simple leafing without risk of tearing. The wide ranging non-obscuring arm of this device, set to an ample potential torque, will keep a book open with pages squarely in place with any minimum pressure necessary, thus permitting safe, easy leafing without obstruction or distraction.

This book stand, in plastic material, can be essentially molded, or adhesively assembled by components. A substantially equivalent embodiment of this book stand can be produced in light attractive metal, properly flanged and ribbed for rigidity. Although many synthetic materials could reliably be used, to achieve an appealing aesthetic warmth, contributing to relaxed reading pleasure, this bookstand is best constructed in wood, particularly hardwood plywood, abundant in variety and beauty.

This invention can conveniently embody a battery integrated illumination system to further enhance its utility and environment range.

Although I have described this invention with a certain degree of particularity, it is understood that the present disclosure has been made only by way of example and that numerous changes in the details of construction and combination and arrangement of parts may be resorted to without departing from the spirit or the scope of the invention as hereinafter claimed.

What is claimed is:

1. In a reading stand, a flat base, a spaced pair of hinge brackets secured to said base, a pintle-platform structure extending between said brackets and rotatably supported thereby, said pintle-platform structure including a book-supporting platform extending forwardly therefrom, a superstructure mounted on said pintle-platform structure above said book-supporting platform and including at least one plate adapted to support a book resting on said platform and leaning against said plate, a pair of page controls for adjustable page holding pressure secured to opposite sides of said pintle-platform structure and extending upwardly therefrom, each page control being movable between a page-holding position against the adjacent page of a book resting on said platform, and a retracted position, and means for frictionally restraining each page control against movement from its page-holding position to its retracted position.

2. The combination according to claim 1, each page control comprising a hook-shaped wire arm having a spherical member secured to the lower end thereof, a tensioned spring housing partially surrounding and frictionally supporting each spherical member, and a bracket mounting each spring housing on said pintle-platform structure.

3. In a reading stand, a flat base, a spaced pair of hinge brackets secured to said base, each bracket comprising a flat metal strip having an arcuate pintle-supporting portion, a straight forwardly exposed leg extending forwardly and downwardly from said arcuate portion and terminating in a first mounting flange, a tension adjusting flange at the other end of said arcuate portion and parallel to said leg, means for adjustably drawing said tension adjusting flange toward said leg, and an outstruck extension on said arcuate portion terminating in a second mounting flange in substantially the same plane as the first mounting flange, a pintle-platform structure extending between said brackets and rotatably supported thereby, said pintle-platform structure including a book-supporting platform extending forwardly therefrom, and a superstructure mounted on said pintle-platform structure above said book-supporting platform and including at least one plate adapted to support a book resting on said platform and leaning against said plate.

4. In a reading stand, a flat base, a spaced pair of hinge brackets secured to said base, a pintle-platform structure extending between said brackets and rotatably supported thereby, said pintle-platform structure including a book-supporting platform extending forwardly therefrom, said pintle-platform structure further including an elongated member of full half round cross-sectional shape with members of short lengths and having identical cross-sectional shapes secured to the ends thereof to form pintles, and a superstructure mounted on said pintle-platform structure above said book-supporting platform and including at least one plate adapted to support a book resting on said platform and leaning against said plate.

5. In a reading stand, a flat base, a spaced pair of hinge brackets secured to said base, a pintle-platform structure extending between said brackets and rotatably supported thereby, said pintle-platform structure including a book-supporting platform extending forwardly therefrom, a superstructure mounted on said pintle-platform structure and comprising a pair of spaced-apart plates angularly related at a forwardly facing wide obtuse angle, and a pair of preformed braces secured to the backs of said plates, the space between said plates being adapted to accommodate the back of a book.

6. In a reading stand, a flat base, a spaced pair of hinge brackets secured to said base, a pintle-platform structure extending between said brackets and rotatably supported thereby, said pintle-platform structure comprising an elongated member having a full half round cross-sectional shape along the major portion of its extent with fully cylindrical pintle-ends, a book-supporting platform having a narrow portion secured to said elongated member between said pintle-ends and a wider portion extending forwardly therefrom and adapted to support a book, a superstructure comprising a pair of spaced-apart plates forming a forwardly facing angle of about 160° and resting on said platform, a pair of bracing blocks on said platform extending upwardly behind said plates, a first cross brace extending between said bracing blocks and behind said plates, and a second cross brace extending between said superstructure plates above said first brace.

7. In a reading stand, a flat base, a pair of brackets secured to opposite ends of said base adjacent the forward edge thereof, each bracket comprising a flat strip having an arcuate main portion, a forwardly exposed leg extending downwardly and forwardly from one end of said arcuate main portion and terminating in a first mounting flange, an outstruck rearwardly bent portion adjacent the other end of said arcuate main portion and having a second mounting flange, said mounting flanges being secured to said base, a tension adjusting flange of said other end of said arcuate main portion and extending substantially parallel to said forwardly and downwardly extending leg, a screw extending through an apertured portion of said leg and threadably mounted in said tension adjusting flange, a pintle-platform structure comprising an elongated member of semi-cylindrical cross-sectional shape along its main extent and terminating in fully cylindrical ends disposed within the arcuate main portions of said brackets, a book-supporting platform secured to the semi-cylindrical portion of said elongated member and extending forwardly therefrom, a superstructure comprising a pair of spaced-apart plates extending upwardly from said platform and forming a large forwardly facing obtuse angle with each other, and at least one cross brace secured to the backs of said plates and extending between them.

8. The combination according to claim 7, further provided with a pair of brackets secured to the opposite ends of said platform and extending outwardly therefrom, a pair of page control members comprising hook-shaped wire arms having spherical members secured to the lower ends thereof, and spring housings comprising slitted strips having parallel bands surrounding the central portions of said spherical members and having their ends secured to said brackets.

9. The combination according to claim 8, the parallel bands of said spring housing strips being bent and formed to the contour of said spherical members, said means for securing each spring housing to its corresponding bracket comprising a pair of legs on the spring housing and on opposite sides of said bracket, and a fastener passing through said legs and bracket, the shape of said spring housing being such that said fastener will hold the spring housing in tension so as to create a substantial frictional connection betweent the spring housing and spherical member.

10. The combination according to claim 8, further provided with a cap of frictional material at the upper end of each of said hook-shaped wire arms to provide side slip resistance for said pages, the hook-shaped wire minimizing obscuration of the print on said pages.

11. In a hinge bracket for use in mounting a pintle for rocking movement about an axis parallel to a flat base, a flat strip having an arcuate main portion, a forwardly exposed leg extending downwardly and forwardly from one end of said arcuate main portion and terminating in a first mounting flange, an outstruck rearwardly bent portion adjacent the other end of said arcuate main portion and having a second mounting flange, said mounting flanges being secured to said base, a tension adjusting flange at said other end of said arcuate main portion and extending substantially parallel to said forwardly and downwardly extending leg, and a screw extending through an apertured portion of said leg and threadably mounted in said tension adjusting flange.

12. A pintle-platform structure comprising an elongated member having a full half-round cross-sectional shape throughout its entire extent, relatively short members having cross-sectional shapes identical with the cross-sectional shape of said elongated member, the flat surfaces of said short members being secured to the flat surface of said elongated member at the opposite ends thereof, and a platform secured to the flat surface of said elongated member between said end-mounted members and extending outwardly therefrom.

13. A pintle-platform structure comprising an elongated member having a main section of full half-round cross-sectional shape, and sections on said elongated member of fully cylindrical shape, and a flat member comprising a securing section mounted on said main elongated member section, and a platform section extending outwardly from said mounting section.

14. The combination acccording to claim 13, further provided with a flat base parallel to said elongated member, and a pair of mounting brackets supporting said pintle-platform structure for frictionally retarded rotation on said base, each bracket comprising a flat strip having a arcuate main portion surrounding the corresponding cylindrical end of said pintle-platform structure, a downwardly extending straight leg at one end of said arcuate main portion, an outstruck portion bent away from said arcuate main portion adjacent the other end thereof, base mounting flanges at the outer end of said straight leg and the outer end of said outstruck portion secured to said base, a tension adjusting flange at the other end of said arcuate main portion extending substantially parallel to said straight leg, and a screw extending through an apertured portion of the straight leg and threadably mounted in said tension adjusting flange.

References Cited by the Examiner
UNITED STATES PATENTS

| 2,449,492 | 9/48 | Long | 248—454 |
| 2,570,439 | 10/51 | Forca | 248—452 |
| 2,610,434 | 9/52 | Romaniuk | 248—445 |
| 2,691,238 | 10/54 | Svatos | 248—456 |

FRANK B. SHERRY, *Primary Examiner.*